United States Patent
Li

(10) Patent No.: US 10,530,171 B2
(45) Date of Patent: Jan. 7, 2020

(54) RAPID DISCHARGE CIRCUITS SUITABLE FOR USE IN A SOFT-START CIRCUIT AND RELATED SOFT-START CIRCUITS AND METHODS

(71) Applicant: CommScope Technologies LLC, Hickory, NC (US)

(72) Inventor: ManKun Li, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/281,134

(22) Filed: Feb. 21, 2019

(65) Prior Publication Data

US 2019/0229545 A1 Jul. 25, 2019

Related U.S. Application Data

(62) Division of application No. 15/172,354, filed on Jun. 3, 2016, now Pat. No. 10,263,445.

(30) Foreign Application Priority Data

Jun. 19, 2015 (CN) .......................... 2015 1 0346522

(51) Int. Cl.
*H02J 7/00* (2006.01)
*H02J 7/14* (2006.01)
(Continued)

(52) U.S. Cl.
CPC ............. *H02J 7/0063* (2013.01); *H02M 1/36* (2013.01); *H02J 7/007* (2013.01); *H02J 7/0016* (2013.01);
(Continued)

(58) Field of Classification Search
USPC ....... 320/136, 134, 127, 129, 130, 132, 135, 320/116, 118, 107, 119, 128, 122, 137
See application file for complete search history.

(56) References Cited

U.S. PATENT DOCUMENTS 5,233,508 A 8/1993 Yamamura et al.
5,610,503 A 3/1997 Fogg et al.
(Continued)

FOREIGN PATENT DOCUMENTS

EP 2 592 738 A2 1/2014

OTHER PUBLICATIONS

FIG 1 of the present application and associated description thereof.
(Continued)

*Primary Examiner* — Alexis B Pacheco
(74) *Attorney, Agent, or Firm* — Myers Bigel, P.A.

(57) ABSTRACT

A rapid discharge circuit comprises a detection circuit that is coupled to a power supply and that is configured to detect a voltage of a signal output by the power supply; a control circuit that is configured to generate a start signal in response to the detected voltage decreasing below a specified threshold value; an executing circuit having a first node that is coupled to the power supply and a second node that receives the start signal; a blocking circuit that has a first terminal coupled to a third node of the executing circuit and a second terminal coupled to an external circuit, where the executing circuit and the blocking circuit are configured to switch on in response to the start signal to form a current path for discharging the external circuit.

19 Claims, 7 Drawing Sheets

(51) Int. Cl.
*H02M 1/36* (2007.01)
*H02M 1/32* (2007.01)

(52) U.S. Cl.
CPC ..... *H02J 7/0021* (2013.01); *H02J 2007/0067* (2013.01); *H02M 2001/322* (2013.01)

(56) References Cited

U.S. PATENT DOCUMENTS

| | | |
|---|---|---|
| 5,613,229 A | 3/1997 | Baranowski et al. |
| 2004/0075600 A1 | 4/2004 | Vera et al. |
| 2007/0030709 A1 | 2/2007 | Kitagawa |
| 2007/0077468 A1 | 4/2007 | Norimatsu et al. |
| 2011/0101940 A1 | 5/2011 | Kudo |
| 2012/0043818 A1 | 2/2012 | Stratakos et al. |
| 2012/0162914 A1 | 6/2012 | Phichej |
| 2012/0212201 A1 | 8/2012 | Lee et al. |
| 2012/0235657 A1 | 9/2012 | Ito et al. |
| 2012/0268074 A1 | 10/2012 | Cooley et al. |
| 2015/0002165 A1 | 1/2015 | Juntunen et al. |
| 2015/0263542 A1 | 9/2015 | Sato et al. |
| 2016/0372953 A1 | 12/2016 | Li |

OTHER PUBLICATIONS

International Search Report and Written Opinion Corresponding to International Application No. PCT/US2016/036001; dated Sep. 20, 2016; 12 Pages.
Notification Concerning Transmittal of International Preliminary Report on Patentability, corresponding to International Application No. PCT/US2016/036001, dated Dec. 28, 2017, 9 pages.

RAPID DISCHARGE CIRCUITS SUITABLE FOR USE IN A SOFT-START CIRCUIT AND RELATED SOFT-START CIRCUITS AND METHODS

CROSS REFERENCE TO RELATED APPLICATION

The application claims priority as a divisional under 35 U.S.C. § 120 from U.S. patent application Ser. No. 15/172,354, filed Jun. 3, 2016, which in turn claims priority under 35 U.S.C. § 119 from Chinese Patent Application No. 201510346522.1, filed on Jun. 19, 2015, the entire contents of each are incorporated herein by reference as if set forth in their entirety.

FIELD OF THE INVENTION

The present disclosure relates to a rapid discharge circuits and, more particularly, to rapid discharge circuits that are suitable for use in a soft-start circuit.

BACKGROUND

When an electronic circuit is turned on, in order to prevent an inrush current that may negatively impact an input DC-bus voltage, a soft-start circuit will usually be included in the electronic circuit to control the inrush current to stay below a reasonable threshold value.

Typically, a soft-start circuit consists of a field-effect transistor and a slow start control circuit. The slow start control circuit controls a rate of increase in the voltage between the gate and the source (GS) of the field-effect transistor so as to slowly switch on the field-effect transistor, thereby suppressing an inrush current that may otherwise occur instantaneously when the power supply voltage is applied to the electronic circuit.

Conventional soft-start circuits constructed from discrete components may work well the first time they are turned on. However, after these conventional soft-start circuits are turned off, they may require a relatively long time period before they reset completely. If the time interval between the power supply being turned off and the power supply being turned on again is relatively short, then, when the power supply is turned on again, the soft-start circuit may not work properly, as the inrush current may exceed a set threshold value and this may lead to unpredictable consequences.

SUMMARY

In a first aspect, embodiments of the present invention provide a rapid discharge circuit, comprising: a detection circuit that is coupled to a power supply and that is configured to detect a voltage of a signal output by the power supply; a control circuit that is configured to generate a start signal in response to the detected voltage decreasing below a specified threshold value; an executing circuit having a first node that is coupled to the power supply and a second node that receives the start signal; a blocking circuit that has a first terminal coupled to a third node of the executing circuit and a second terminal coupled to an external circuit, where the executing circuit and the blocking circuit are configured to switch on in response to the start signal to form a current path for discharging the external circuit.

In one aspect, the executing circuit comprises a first transistor. The blocking circuit may be configured to shut off in response to the power supply turning on to block a leakage current through the executing circuit. This leakage current path may be between a current-carrying electrode and control electrode of the first transistor.

In one aspect, the blocking circuit comprises a Schottky barrier diode, where the positive electrode of the Schottky barrier diode is coupled to the executing circuit, and the negative electrode of the Schottky barrier diode is coupled to the external circuit.

In one aspect, the blocking circuit comprises a low-leakage electronic switch that is configured to shut off in response to the power supply turning on to block a leakage current in the executing circuit, the low-leakage switch further configured to switch on in response to the start signal to provide a current path for discharging the external circuit.

In one aspect, a control electrode of the first transistor is controlled by the start signal and a first current-carrying electrode of the first transistor is coupled to the power supply, wherein the first transistor is switched on in response to receiving the start signal so as to form a current path to discharge the external circuit through a first current-carrying electrode and a second current-carrying electrode of the first transistor.

In one aspect, the control circuit comprises a second transistor, and the control electrode of the second transistor is coupled to the detection circuit, a first current-carrying electrode of the second transistor is coupled to the executing circuit, and a second current-carrying electrode of the second transistor is coupled to a reference voltage, where the second transistor is configured to remain switched on prior to the detected voltage decreasing below a specified threshold value, the second transistor being configured to shut off in response to the detected voltage decreasing below the specified threshold value.

In one aspect, the detection circuit comprises a voltage divider, with a first end of the voltage divider coupled to the power supply, a second end of the voltage divider coupled to a reference voltage, and the voltage-dividing end of the voltage divider coupled to the control electrode of the second transistor.

The rapid discharge circuit may be combined with a soft-start circuit, the soft-start circuit comprising a soft-start field effect transistor and a first external capacitance bridging a gate and a source of the soft-start field effect transistor, where the blocking circuit is configured to be turned off when the soft-start circuit is turned on and is configured to be switched on when the soft-start circuit is turned off.

In a second aspect, the present invention provides a rapid discharge method, with the method comprising: providing the rapid discharge circuit as described in the first aspect of the present invention; coupling the rapid discharge circuit to a circuit and a power supply; using the detection circuit to detect a voltage of a signal output by the power supply; using the control circuit to generate a start signal in response to the detected voltage decreasing below a specified threshold value; and responsive to the start signal, switching the blocking circuit and the executing circuit on to form a discharge loop for discharging the circuit.

In a third aspect, a circuit is provided that includes a soft-start circuit that includes a soft-start field-effect transistor and a first external capacitance bridging the gate and source of the soft-start field-effect transistor and a rapid discharge circuit coupled to the soft-start circuit, the rapid discharge circuit comprising a blocking circuit that is configured to be turned off when the soft-start circuit is turned on and is configured to be switched on when the soft-start circuit is turned off.

In one aspect, the rapid discharge circuit may further comprise a detection circuit that is coupled to a power supply and that is configured to detect a voltage of a signal output by the power supply.

In one aspect, the rapid discharge circuit may further comprise a control circuit that is configured to generate a start signal in response to the detected voltage decreasing below a specified threshold value.

In one aspect, the rapid discharge circuit may further comprise an executing circuit having a first node that is coupled to the power supply and a second node that receives the start signal.

In one aspect, the blocking circuit may include a first terminal that is coupled to a third node of the executing circuit and a second terminal that is coupled to an external circuit.

In one aspect, the executing circuit and the blocking circuit may be configured to switch on in response to the start signal to form a current path for discharging the external circuit.

In one aspect, the circuit may be provided in combination with a soft-start circuit, the soft-start circuit comprising a soft-start field-effect transistor; and a first external capacitance bridging a gate and a source of the soft-start field-effect transistor, wherein the blocking circuit is configured to be turned off when the soft-start circuit is turned on and is configured to be switched on when the soft-start circuit is turned off.

In one aspect, the detection circuit may comprise a voltage divider, wherein a first end of the voltage divider is coupled to the power supply, a second end of the voltage divider is coupled to a reference voltage, and a voltage-dividing end of the voltage divider coupled to the control electrode of the second transistor.

BRIEF DESCRIPTION OF THE DRAWINGS

The present application includes drawings. The drawings and specification are used together to describe the principles of the present disclosure. A better understanding of the present disclosure can be achieved by reading the following description with reference to the drawings. In the drawings.

DETAILED DESCRIPTION

Embodiments of the present disclosure are described below with reference to the drawings. Appropriate changes should be made to the configuration and various conditions of the apparatus of the embodiments of the present disclosure according to the relationship between the parts and corresponding position of the embodiments. In other words, the following embodiments are not expected to limit the scope of the present disclosure.

Figure 1:
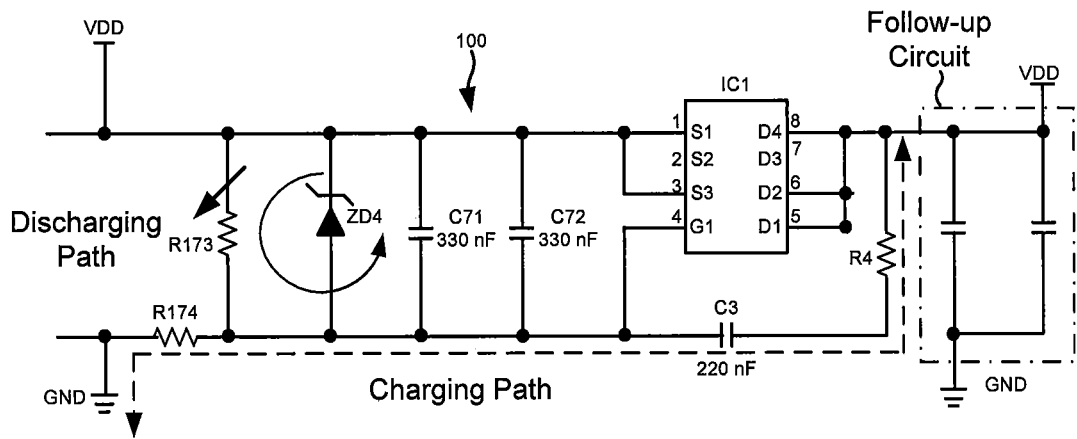
FIG. 1 is a circuit diagram of an example of a conventional soft-start circuit.

The following is an exemplary description of the operating principle of a conventional soft-start circuit with reference to FIG. 1. The soft-start circuit of FIG. 1 may limit the DC inrush current to a relatively low level.

One example of an application for a soft-start circuit is use in a remote electrical tilt (RET) antenna. Typically, an Antenna Interface Standards Group (AISG) bus can control a total of 24 AISG devices (such as a remote electrical tilt antenna). The AISG output from a master provides a 24 V DC power supply and a 2 A current limit, and 2 A can be a hardware switch-off limit. Thus, in some situations, a total of 24 devices may be coupled to the AISG bus and these 24 devices may be turned on at the same time, within the entire DC input range of 10 V~30 V and the entire temperature range of −40° C.~+55° C. In such a situation, the AISG peak inrush current value from slave devices should not exceed 83 mA (2000 mA/24 devices≈83 mA). In other words, in this specific example, the soft-start circuit should limit the inrush current of the devices to which it relates (in this embodiment, the control panel of the remote electrical tilt antenna) to not be in excess of 83 mA. The following is a description of the technical solution of the present invention in conjunction with the above context.

Referring to FIG. 1, a structural diagram of a conventional soft-start circuit is illustrated. This soft-start circuit includes a field-effect transistor (IC1), slow-charging capacitors (C71, C72 and C3), resistors (R173 and R174) and a Zener diode (ZD4).

As is shown in FIG. 1, the soft-start circuit is installed between the power supply and a follow-up circuit, preventing the impact of the inrush current on the AISG DC-bus voltage when the power supply is turned on.

The field-effect transistor (IC1) has a gate (GI), sources (S1-S3) and drains (D1-D4). The capacitor C3 and resistor R4 are connected in series between the gate and drain of the field-effect transistor IC1. The capacitors C71, C72 are bridged in parallel between the gate and source of the field-effect transistor IC1. The Zener diode ZD4 and resistor R173 are connected in parallel, and are also bridged between the gate and source of the field-effect transistor IC1. One end of the resistor R174 is coupled to the gate of the field-effect transistor IC1 and the other end is coupled to earth ground or another reference voltage. The DC power supply VDD is connected to the source of the field-effect transistor IC1. The capacitors C62 and C75 act as a load connected to the drain of the field-effect transistor IC1, and act as a storage element of the follow-up circuit.

When the power supply is turned on, there is external gate-drain capacitance C3 of the field-effect transistor IC1, an internal gate-drain capacitance $C_{gd}$ between the gate and drain of the field-effect transistor IC1 (positioned inside the field-effect transistor IC1, not shown in the drawings), an internal gate-source capacitance $C_{gs}$ between the gate and source of the field-effect transistor IC1 (positioned inside the field-effect transistor IC1, not shown in the drawings), and external capacitors C71 and C72. The gate-drain capacitance $C_{gd}$ of the field-effect transistor IC1 may have a non-linear dependence on an externally-applied voltage. The capacitor C3 bridged between the gate and drain of the field-effect transistor IC1 is equivalent to a parallel connection with the gate-drain capacitance $C_{gd}$. As the capacitance value of the capacitor C3 is greater than the value of the gate-drain capacitance $C_{gd}$, the existence of the capacitor C3 stabilises the current through the source and drain of the field-effect transistor IC1 when the power supply is turned on, and the existence of this stable current (i.e., the current applied to the follow-up circuit through the field-effect transistor IC1) means that the internal gate-drain capacitance of the field-effect transistor can be ignored. In other words, the existence of the external gate-drain capacitance C3 offsets the impact of the non-linear, voltage-dependent internal gate-drain capacitance $C_{gd}$ of the field-effect transistor.

As noted above, an internal gate-source capacitance $C_{gs}$ also exists between the gate and source of the field-effect transistor IC1. This gate-source capacitance $C_{gs}$ is equivalent to being connected in series with C3, and the value of the gate-source capacitance $C_{gs}$ is much lower than the value of C3. In a circuit where capacitance is connected in series, the two ends of the small capacitance will share a larger voltage. That is, if the external capacitors C71 and C72 are not provided in parallel between the gate and source, then the instant the power is turned on, the voltage between the gate and the source of the field-effect transistor IC1 will get a larger share of voltage, which is greater than the on-voltage threshold of the field-effect transistor IC1, causing the field-effect transistor IC1 to immediately be completely switched on. Providing external capacitors C71 and C72, connected in parallel between the gate and the source of the field-effect transistor IC1 causes the field-effect transistor IC1 to be in a switched off state the instant the power is turned on, so that the soft-start circuit function operates normally. As is illustrated by the arrows in FIG. 1, the low-side resistor R174, capacitors C71 and C72, and capacitor C3 bridging between the gate and source of the field-effect transistor gate provide a charging path for the field-effect transistor gate.

In order to prevent the voltage across the gate and source of the field-effect transistor IC1 from greatly exceeding the gate-source on-voltage threshold (10 V), a Zener diode ZD4 is provided in parallel between the gate and source. In the circuit shown in FIG. 1, the resistance values of the resistors R173 and R174 are equal; if not for the existence of the Zener diode ZD4, the voltage across the gate and source of the field-effect transistor IC1 would be half the input voltage. However, due to the existence of Zener diode ZD4, a leakage current causes the value of the current flowing through R173 to be less than the value of the current flowing through R174, so that the voltage at both ends of the resistance R173 is lower than the voltage at both ends of R174, namely the voltage at both ends of R173 is less than half the input voltage. Therefore, in the actual stable circuit, the voltage across the gate and source of the field-effect transistor IC1 is less than half the input voltage.

Therefore, performing a charging process on the capacitors causes the process of turning on to be slow and controllable, thereby achieving a soft-start function.

However, when the power supply is turned off, the charge on the capacitors C71 and C72 is discharged through resistor R173, as illustrated by the circular arrow of the discharging path shown in FIG. 1. The time constant of the discharge loop formed by R173 is very long and, when the discharge time is not long enough, the gate voltage of the field-effect transistor will not be lower than the gate-source voltage threshold value, the field-effect transistor will still be in the switched-on state and, the next time the power supply is turned on, the field-effect transistor will not be controlled, failing to achieve a soft-start function.

With the field-effect transistor illustrated in FIG. 1 as an example, the following is an explanation of the above scope by making calculations using the values of the node voltage, inrush current and all values of the necessary elements in the soft-start circuit. The values used in the following calculations are only exemplary and it will be appreciated that different embodiments may use different values, but the principle is the same.

Under certain input voltage and output storage capacity circumstances, the inrush current value is dependent on C3, and the high-side resistor R173 and the low-side resistor R174 of the gate of the field-effect transistor.

For example, as described above, as the capacitance value (typically 550 pF) of the gate-source capacitance $C_{gs}$ of the field-effect transistor is much lower than the capacitance value of the external capacitance C3 (for example, 22 nF), then, in the absence of the external capacitors C71 and C72, the voltage divider constituted by the internal gate-source capacitance $C_{gs}$ and the external capacitance C3 will apply a relatively large voltage at the gate of the field-effect transistor. Through calculation, in order to cause a slow switching on when the field-effect transistor is being switched on, it is at least necessary for there to be capacitance in parallel of 506 nF between the gate and source of the field-effect transistor IC1 and, therefore, C71 and C72 have capacitance values of 330 nF (with the total capacitance value of both being 660 nF). The high-side resistance value (5.1 MΩ) is determined by the target $V_{gs}$ level of the field-effect transistor.

In FIG. 1, as described above, the capacitance value of the capacitor C3 is 22 nF, and the resistance value of the gate pull-up resistance R173 and pull-down resistance R174 of the gate of the field-effect transistor is 5.1 MΩ. The inrush current value is calculated according to the following formulae.

$$i_{gd} = I_{R174} - I_{R173} - I_d \quad \text{(Formula 1)}$$

$$i_{gd} \times \Delta T = V_{in} \times C3 \quad \text{(Formula 2)}$$

$$\Delta T = \frac{C_{load} \times V_{max}}{I_{inrush}} \quad \text{(Formula 3)}$$

$$I_{inrush} = \frac{(C_{load} \times V_{max}) \times i_{gd}}{V_{in} \times C3} \quad \text{(Formula 4)}$$

First, the charging current $i_{gd}$ charging C3 is calculated with reference to Formula (1), where $I_{R174}$ is the current flowing through the low-side resistance R174, $I_{R173}$ is the current flowing through the high-side resistance R173, and $I_d$ is the leakage current of the Zener diode ZD4.

Second, the charging time $\Delta T$ is deduced from Formulae (2-3); where the charging charge is equal to the product of the input voltage and capacitance C3, and $\Delta T$ is also related to the load capacitance $C_{load}$ and the maximum voltage value $V_{max}$.

Third, the inrush current $I_{inrush}$ is calculated from Formula (4).

With an input voltage of 24 V, the calculated inrush current peak value is 39.74 mA and the charging time is 144.93 ms. In actual measurements, the inrush current peak value is 40 mA and the charging time is 145 ms. The above calculated values and actual measured values are fundamentally the same.

Figure 2A:
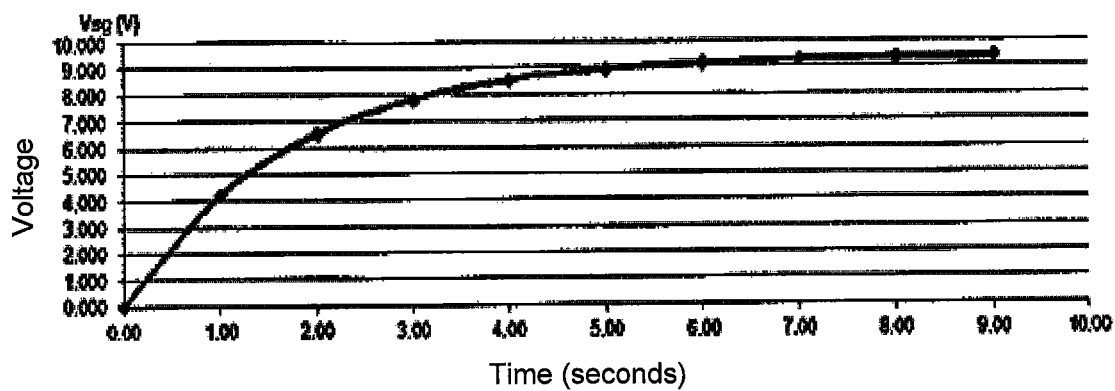
FIGS. 2a and 2b are graphs illustrating changes in voltage between the gate and source of the field-effect transistor during the charging process and discharging process of the soft-start circuit shown in FIG. 1.

Also, the voltage between the gate and source of the field-effect transistor during the charging process is calculated according to Formula (5) below.

$$Vgs == A * \left(1 - e^{-\frac{t}{\tau}}\right) \quad \text{(Formula 5)}$$

where τ is the time constant relating to the resistance and capacitance value in the circuit. A is a constant determined by $I_{R173}$, $I_{R174}$ and $I_d$. FIG. 2a illustrates the voltage change value between the gate and source of the field-effect transistor during the charging process of the soft-start circuit of FIG. 1 calculated according to the above formula. It can be seen from FIG. 2a that, during the charging process, the slow change in voltage between the gate and source of the field-effect transistor ultimately reaches 9.45 V, which is fundamentally consistent with the actual measured value of 9.38 V.

When the field-effect transistor is turned off, the charge stored in the external capacitance bridging the gate and source of the field-effect transistor is released slowly (C71 and C72 totaling 660 nF) which may lead to faults, and it requires quite a long time to discharge through the high-side resistance R173 (5.1 MΩ) and Zener Diode ZD4.

The voltage between the gate and source of the field-effect transistor during the discharging process can be calculated from Formula (6) below.

$$E(t) = Vgs' \times e^{-\frac{t}{\tau}} \quad \text{(Formula 6)}$$

where Vgs' is the voltage between the gate and source of the field-effect transistor after the soft-start circuit has stabilised, and it can be known from the above formula that Vgs' is about 9.45 V.

Figure 2B:
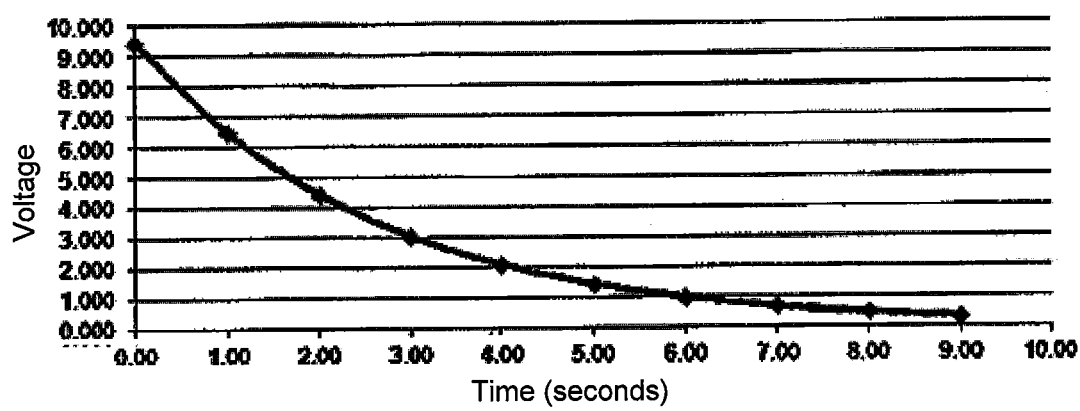

FIG. 2b illustrates the voltage change value between the gate and source of the field-effect transistor during the discharging process of the soft-start circuit of FIG. 1 calculated according to the above formula. It can be seen from FIG. 2b that the time required for the voltage of the external capacitance to be discharged from its stable state value of 9.45 V to less than the gate-source threshold voltage $V_{th}$ (for example 1 V) of the field-effect transistor is about 6 seconds.

If the turning-off time is less than 6 seconds, then the voltage between the gate and source of the field-effect transistor will not be below the threshold voltage and the field-effect transistor will not be completely switched off; when it is next turned on, it may not be possible for the soft-start function to be achieved. This is also a reason for a relatively long time to be required to reset the field-effect transistor before the next time it is turned on.

Figure 3A:
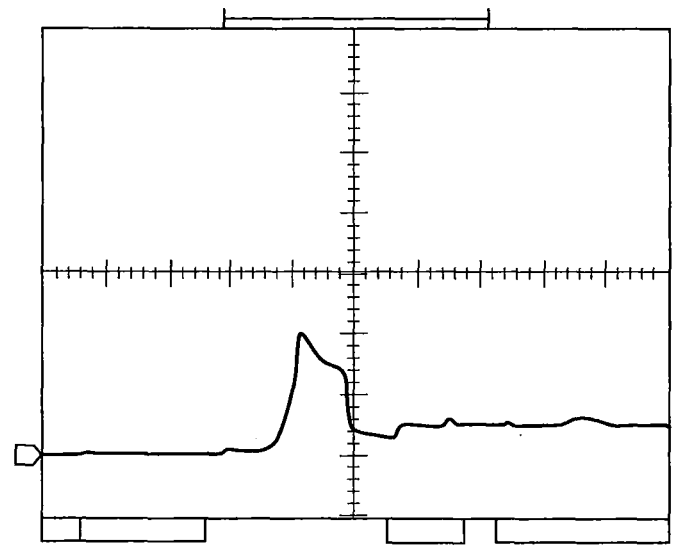
FIGS. 3a and 3b are graphs illustrating the measured inrush current when the circuit of FIG. 1 is turned on at time intervals of 10 seconds and 2 seconds, respectively.
Figure 3B:
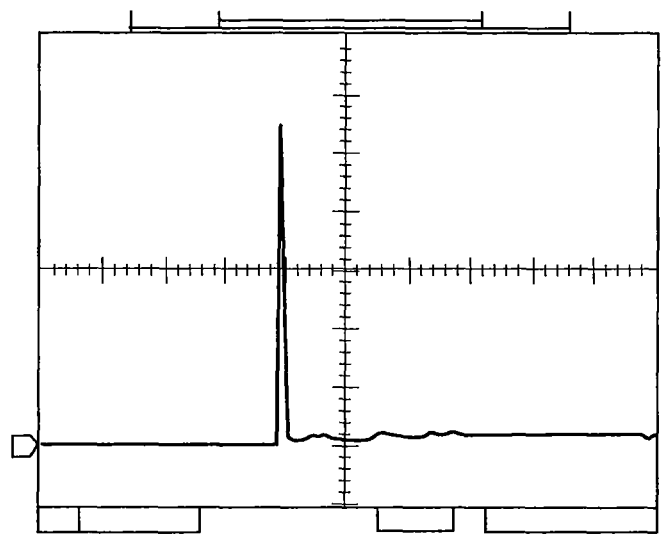

FIGS. 3a and 3b show the measured inrush current when the circuit is turned on at a time interval of 10 seconds and 2 seconds respectively. It can be seen from FIG. 3a that a 10 second time interval is sufficient to fully reset the field-effect transistor IC1 so that the next time it is turned on it is able to work normally, thereby achieving a soft-start function and the inrush current is controlled to be within 50 mA. However, it can be seen from FIG. 3b that, according to the above calculations, the circuit shown in FIG. 1 requires at least 6 seconds to reset the field-effect transistor IC1; therefore, when the circuit is turned on and off at a time interval of 2 seconds, the field-effect transistor is not able to be reset fully and thus, the next time it is turned on, as the field-effect transistor IC1 is controlled and slowly turned on, the inrush current is 550 mA; the value of its inrush current greatly exceeds the safe threshold value (83 mA) and will lead to a protective shutdown due to the overcurrent of the DC-bus voltage.

In order to solve the above-described technical problems, the present disclosure provides rapid discharge circuits that are suitable for use in a soft-start circuit. When the rapid discharge circuit is turned on, it does not interfere with the normal operation of the soft-start circuit, and, when the rapid discharge circuit is turned off, it is able to rapidly discharge the capacitance in the soft-start circuit so as to rapidly reset the field-effect transistor in the soft-start circuit, so that, before the slow-start circuit is next switched on, the field-effect transistor is switched off completely, and the soft-start circuit is thus able to work normally so that the inrush current is controlled to be below a reasonable threshold value.

Figure 4:
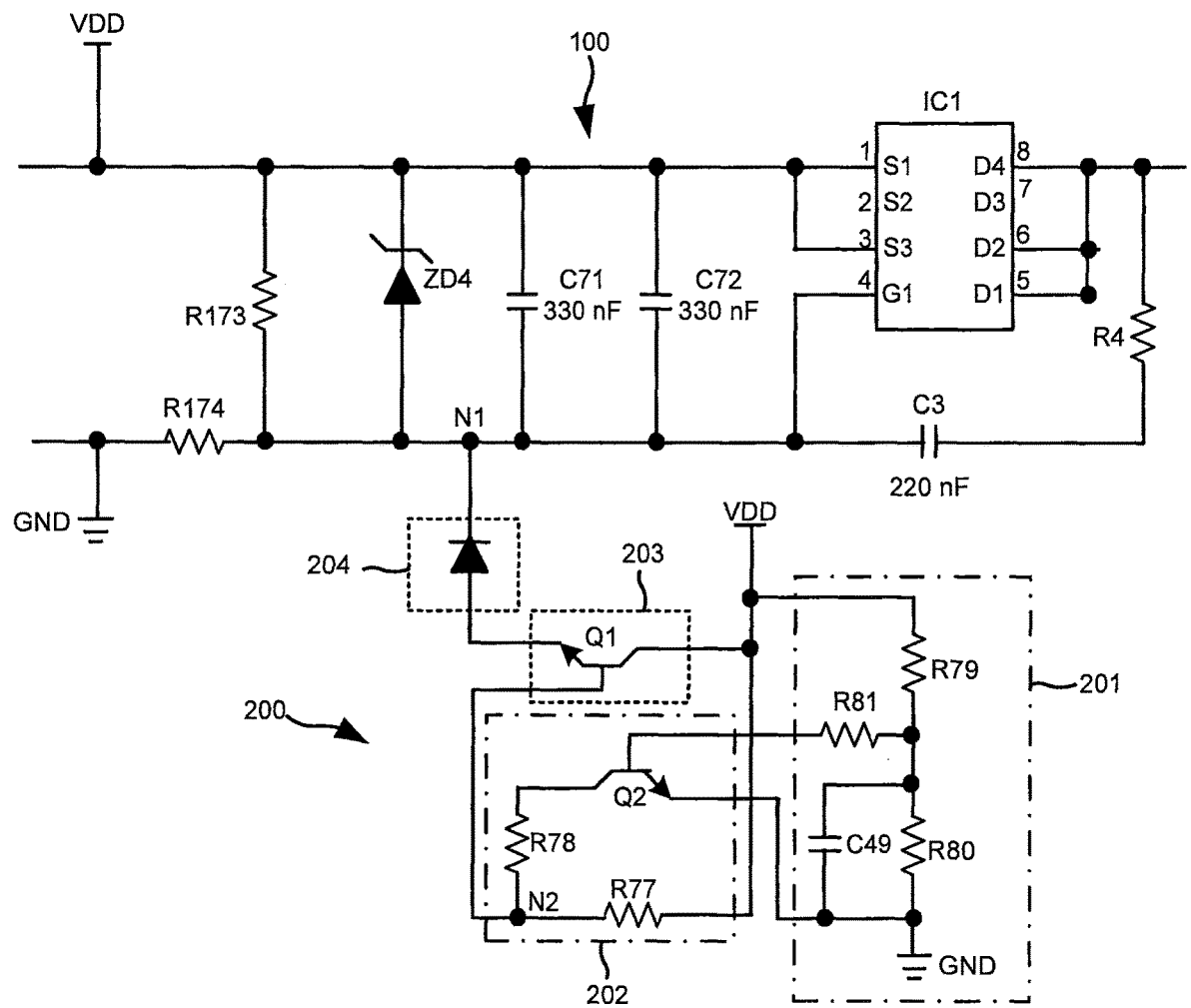
FIG. 4 is a circuit diagram illustrating a rapid discharge circuit according to an embodiment of the present disclosure.

Referring to FIG. 4, in one embodiment of the present disclosure, the rapid discharge circuit 200 is connected between the gate and power supply VDD of the field-effect transistor IC1 of the soft-start circuit 100. The soft-start circuit 100 is as described above. The rapid discharge circuit 200 comprises a detection circuit 201, a control circuit 202, an executing circuit 203 and a blocking circuit 204.

The detection circuit 201 is connected to the power supply VDD, that is, the field-effect transistor source, so as to detect the voltage of the power supply. A first terminal of the control circuit 202 is connected to the detection circuit 201, and a second terminal of the control circuit 202 is connected to the executing circuit 203. The control circuit 202 is configured to generate a start signal in response to the detected voltage decreasing below a specified threshold value. The executing circuit 203 is controlled by the start signal. A first terminal of the blocking circuit 204 is coupled to the executing circuit 203, and a second terminal of the blocking circuit 204 is coupled to the gate of the field-effect transistor IC1 of the soft-start circuit 100. In FIG. 4, the gate node of the field-effect transistor IC1 is indicated as N1. When the power supply is turned on, the blocking circuit 204 is switched off so as to isolate the rapid discharge circuit 200 and the soft-start circuit 100; and, responsive to the start signal, the blocking circuit 204 is switched on, and, through the executing circuit 203 and the blocking circuit 204, a current path for discharging the capacitance of the soft-start circuit 100 is formed.

In one embodiment of the present disclosure, the executing circuit 203 comprises a first transistor Q1, the base of the first transistor Q1 is coupled to the control circuit 202, the emitter of the first transistor Q1 is coupled to the positive terminal of the blocking circuit 204, and the collector of the first transistor Q1 is coupled to the power supply VDD.

In one embodiment of the present disclosure, the control circuit 202 comprises a second transistor Q2, the base of the second transistor Q2 is coupled to the detection circuit 201, the emitter of the second transistor Q2 is coupled to earth ground (or another reference voltage), and the collector of the second transistor Q2 is coupled to the executing circuit through the resistor R78 and coupled to the power supply VDD through resistors R78 and R77.

In one embodiment of the present disclosure, the detection circuit 201 comprises a voltage divider, where one end of the voltage divider is coupled to the power supply and the other end of the voltage divider is coupled to earth ground (or another reference voltage); the voltage dividing end of the voltage divider is coupled to the base of the second transistor Q2. In the embodiment disclosed in FIG. 4, the detection circuit 201 comprises a voltage divider circuit consisting of R79, R80, R81 and C49.

In one embodiment of the present disclosure, the blocking circuit 204 comprises a Schottky barrier diode, with the positive electrode of the Schottky barrier diode being coupled to the executing circuit, and the negative electrode of the Schottky barrier diode being coupled to the first node N1.

When the power supply is turned on, the power supply causes the field-effect transistor that is included in the soft-start circuit to be switched on slowly through charging the capacitors C71, C72 and C3, thus achieving a soft-start function. As the first transistor Q1 of the executing circuit 203 is not an ideal device, it is possible for a reverse recovery current to exist during the turning on process. The reverse recovery current may cause the soft-start function of the soft-start circuit 100 to fail. However, in one embodiment of the present disclosure, the Schottky barrier diode is connected between the soft-start circuit 100 and executing circuit 203, its reverse recovery current is almost zero, reverse blocking is quick, and it is possible to prevent the impact of the reverse recovery current formed between the emitter and base of the first transistor Q1 in the turning on process on the charging process of C71, C72 and C73.

Specifically, if there is no Schottky barrier diode reverse blocking (or other blocking circuit) forming a shield between the soft-start circuit 100 and rapid discharge circuit 200, then, during the turning on process, a leakage current path may be formed through the emitter of the first transistor Q1 of the executing circuit 203 to the base thereof and then through R78 to the collector of the transistor Q2 of the control circuit 202 to earth ground. The leakage current will, in the turning on process, rapidly charge the gate and source of the field-effect transistor, thereby switching on the field-effect transistor IC1 relatively quickly and causing the soft-start function to fail.

In the embodiment of FIG. 4, when the circuit is being turned on, the Schottky barrier diode will shield the rapid discharge circuit 200 with respect to the soft-start circuit 100, blocking the leakage current path, and enabling the soft-start circuit 100 to operate normally. Namely, the Schottky barrier diode will play a role in unidirectional blocking.

In one embodiment of the present disclosure, when the soft-start circuit 100 is in a period of normal operation after turning on, the first transistor Q1 is switched off and the second transistor Q2 is switched on.

Specifically, with the embodiment of the present disclosure as illustrated in FIG. 4 as an example, if the power supply voltage VDD is, for example, 24 V, the voltage is divided through the resistors R79, R80 and R81, the voltage is coupled to the base of the second transistor Q2, and the emitter of the second transistor Q2 is coupled to earth ground; at this time, the conditions for switching on the transistor Q2 are met and the second transistor Q2 is thus switched on.

Furthermore, the power supply voltage VDD forms a path through the resistors R77, R78 and the collector of the second transistor Q2 to the emitter. As is shown in FIG. 4, the voltage of the second node N2 is produced by the resistors R77 and R78 dividing the voltage. Since the resistance values of the resistors R77 and R78 are equal, the voltage of the second node N2 is thus half of the power supply voltage VDD (24 V), namely 12 V. Furthermore, the base of the first transistor Q1 is connected to the second node N2. The base voltage of Q1 is thus 12 V. Furthermore, the emitter of the first transistor Q1 is coupled to the gate of the field-effect transistor in the main circuit (node N1) through the Schottky barrier diode. It can be understood from the above description of the soft-start circuit that, when the soft-start circuit is in a period of normal operation after turning on, the voltage between the gate and source of the field-effect transistor IC1 is around 9.45 V, and thus the voltage of the first node N1 is around 14.55 V ($\approx$24 V (power supply voltage VDD)–9.45 V). It can be seen that, when the circuit is in a period of normal operation after turning on, the base voltage of the first transistor Q1 (12 V) is less than the emitter voltage (14.55 V), which does not meet its conditions for switching on, so the first transistor Q1 thus remains switched off and the Schottky barrier diode is also in a reverse bias state.

When the power supply is turned off, the control circuit 202 is responsive to the detection circuit 201 detecting that the power supply voltage has decreased to a value less than a specified threshold value (for example, 9.5 V) and generates a start signal. The base of the first transistor Q1 is controlled by the start signal. Prior to receiving the start signal, the first transistor Q1 remains switched off; responsive to receiving the start signal, the first transistor Q1 is switched on in saturation, namely, the voltage difference between the collector and emitter reaches the switching on threshold value of the first transistor Q1 causing Q1 to switch on, so that a current path for discharging the capacitance of the soft-start circuit is formed through the collector and emitter of the first transistor Q1.

Specifically, when turned off, when the power supply voltage VDD has decreased to a value less than a specified threshold value, as the voltage connecting the voltage divider of the detection circuit 201 to the base of the second transistor Q2 is less than its switching on voltage, the second transistor Q2 will switch off. As the current path (R77→R78→collector of Q2→emitter of Q2→earth ground) formed by the second transistor Q2 switching on will switch off, at this time, the power supply voltage VDD will directly drive the base of the first transistor Q1 through the resistor R77, namely, the base voltage of the first transistor Q1 is greater than the voltage of the first node N1 (14.45 V) and, therefore, the first transistor Q1 will switch on and the Schottky barrier diode will also switch on. At this time, the positive terminals of the capacitors C71 and C72 (namely, the power supply voltage VDD) will pass through the collector of the first transistor Q1 to the emitter, and, with the Schottky barrier diode being in communication with the first node N1, a discharge loop will be formed. As the saturation driving current of the first transistor Q1 is in the order of several hundred mA, but the charging current of the capacitors C71 and C72 is only in the order of several mA, the rapid discharge of the capacitors C71 and C72 through the first transistor Q1 collector to the emitter can therefore be performed, thus completely switching off the field-effect transistor.

The above is merely an exemplary means of describing the present disclosure, and the various parts of the circuit of the present disclosure are not limited to the disclosed form of realisation. For example, in another embodiment of the present disclosure, the detection circuit may be achieved by a comparator, with the comparator comparing the power supply voltage VDD and specified threshold value and transmitting the comparison results to the control circuit 202. Although the above test references a specific conductivity type transistor to describe a specific embodiment, it will, however, be understood by persons skilled in the art that, by referencing the functions and principles of the circuit given herein, and it is also possible to use an opposite conductivity type transistor to achieve a circuit with the same functions. In one embodiment, a Schottky barrier diode may use an ON Semiconductor MMSD301T1.

In another embodiment of the present disclosure, the blocking circuit 204 comprises a low-leakage electronic switch wherein, when the power supply is turned on, the low-leakage electronic switch is shut off, so as to prevent a leakage current flowing to the executing circuit, and, responsive to the start signal, the low-leakage electronic switch is switched on, and, through the executing circuit and the electronic switch, a current path is formed for discharging the capacitance of the soft-start circuit. In addition to the Schottky diode embodiment given above, the low-leakage electronic switch may also be implemented using a semiconductor device with similar characteristics to those of the Schottky diode.

It is worth noting that standard discharge circuits will all have a parasitic effect, namely, when turning on they will generate a leakage current or a recovery current; as the transistor used in the discharge circuit cannot be an ideal device, a leakage current is thus inevitable. The leakage current may affect the operation of the soft-start circuit, causing the inrush current to exceed the safe threshold value. By introducing a blocking circuit, the present invention shields the discharge circuit with respect to the soft-start circuit when turning on, and, in addition, the blocking circuit is switched on when the power supply is turned off, forming, with the executing circuit, a discharge loop to perform the rapid discharge of the capacitance of the soft-start circuit so as to overcome the problem of the soft-start circuit requiring a relatively long reset time.

Figure 5A:
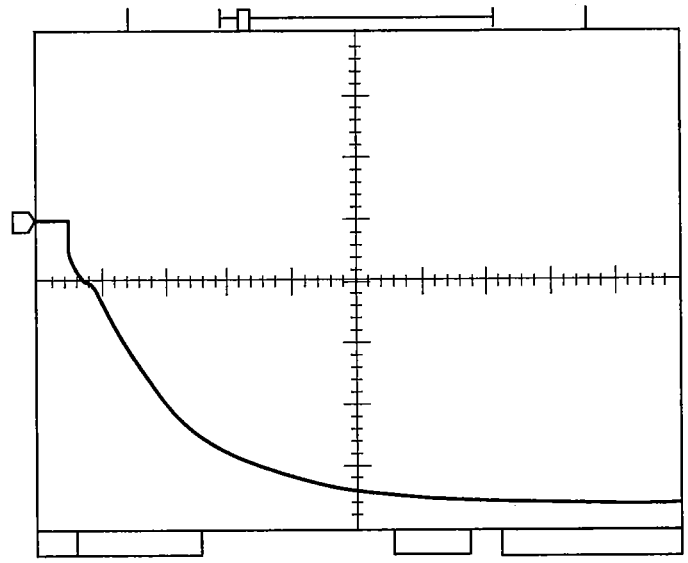
FIG. 5a is a graph illustrating changes in voltage between the gate and source of the field-effect transistor during the turning on process using the rapid discharge circuit of FIG. 4.
Figure 5B:
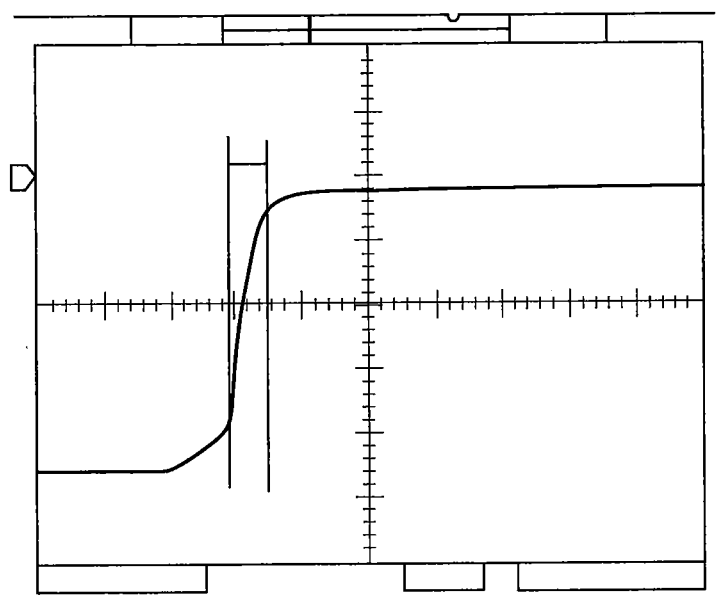
FIG. 5b is a graph illustrating changes in voltage between the gate and source of the field-effect transistor during the turning off process using the rapid discharge circuit of FIG. 4.
Figure 6A:
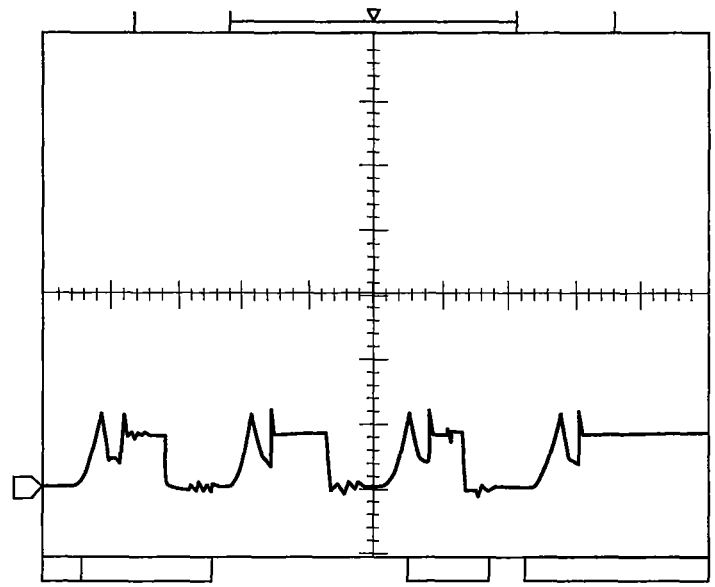
FIG. 6a is a graph illustrating the measured inrush current when the circuit is turned on at a time interval of 0.5 seconds at an input voltage of 30 V using the rapid discharge circuit of FIG. 4.
Figure 6B:
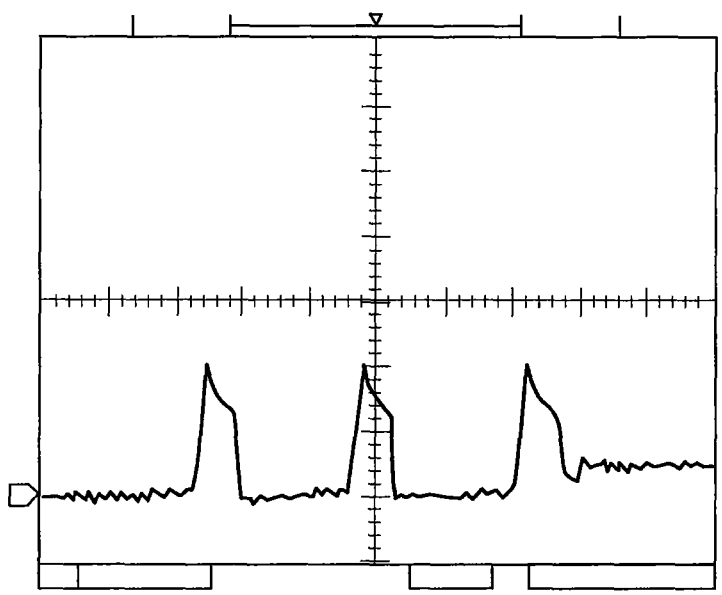
FIG. 6b is a graph illustrating the measured inrush current when the circuit is turned on at a time interval of 1 seconds at an input voltage of 10 V using the rapid discharge circuit of FIG. 4.

The following is a description, with reference to FIG. 5, FIG. 6a and FIG. 6b, of experimental results obtained using the rapid discharge circuit of one embodiment of the present disclosure.

FIG. 5a and FIG. 5b are graphs illustrating changes in voltage between the gate and source of the field-effect transistor during the turning on and turning off process after using the rapid discharge circuit of one embodiment of the present disclosure. It can be seen from FIG. 5a that the rapid discharge circuit has no impact on the turning on process of the soft-start circuit. During the turning on process, the voltage between the gate and source of the field-effect transistor slowly changes until it is switched on. It can be seen from FIG. 5b that, during the turning off process, the rapid discharge circuit responds within 40 ms and rapidly reduces the difference in voltage between the gate and source of the field-effect transistor to less than 0.7 V; this overcomes the existing problem of the soft-start circuit requiring a relatively long reset time.

Table 1 illustrates, after using the rapid discharge circuit of one embodiment of the present disclosure, the size of the inrush current at −45° C., 25° C. and 85° C. when the input voltage is 30 V, 24 V and 20 V respectively. It can be seen from Table 1 that the size of the inrush current and the input voltage are related: the greater the input current, the greater the corresponding inrush current. However, in each of the above circumstances, the size of the resulting inrush current is less than the safe threshold value (83 mA). It can be seen that the rapid discharge current of the present disclosure is able to ensure the normal working of the soft-start circuit when it is being turned on.

TABLE 1

| voltage (V) | −45° C. | | 25° C. | | 85° C. | |
|---|---|---|---|---|---|---|
| | Inrush current (mA) | Vgs (V) | Inrush current (mA) | Vgs (V) | Inrush current (mA) | Vgs (V) |
| 30 V | 56.5 | 11.39 | 60 | 11.65 | 66.5 | 11.72 |
| 24 V | 47 | 9.32 | 49 | 9.38 | 53 | 9.4 |
| 20 V | 41 | 7.72 | 42.5 | 7.78 | 43 | 7.8 |

FIG. 6a is a graph illustrating the inrush current measurement results when the circuit is turned on at a time interval of 0.5 seconds at an input voltage of 30 V after using the rapid discharge circuit of one embodiment of the present disclosure; FIG. 6b is a graph illustrating the inrush current measurement results when the circuit is turned on at a time interval of 1 second at an input voltage of 10 V after using the rapid discharge circuit of one embodiment of the present disclosure. It can be seen from FIG. 6a and FIG. 6b that the rapid discharge circuit enables the soft-start circuit to work normally in a short turning on interval and controls the inrush current to within a safe threshold value.

Figure 7:
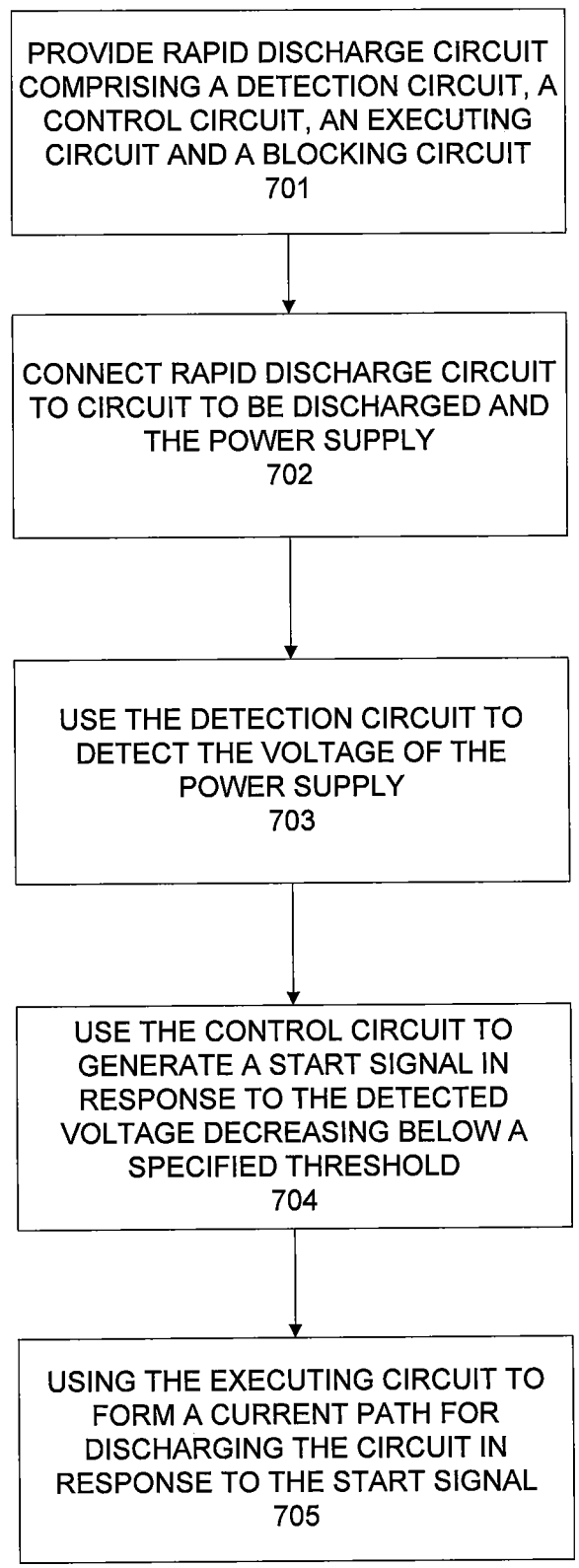
FIG. 7 is a flowchart illustrating a fast discharge method according to an embodiment of the present disclosure.
Figure 8:
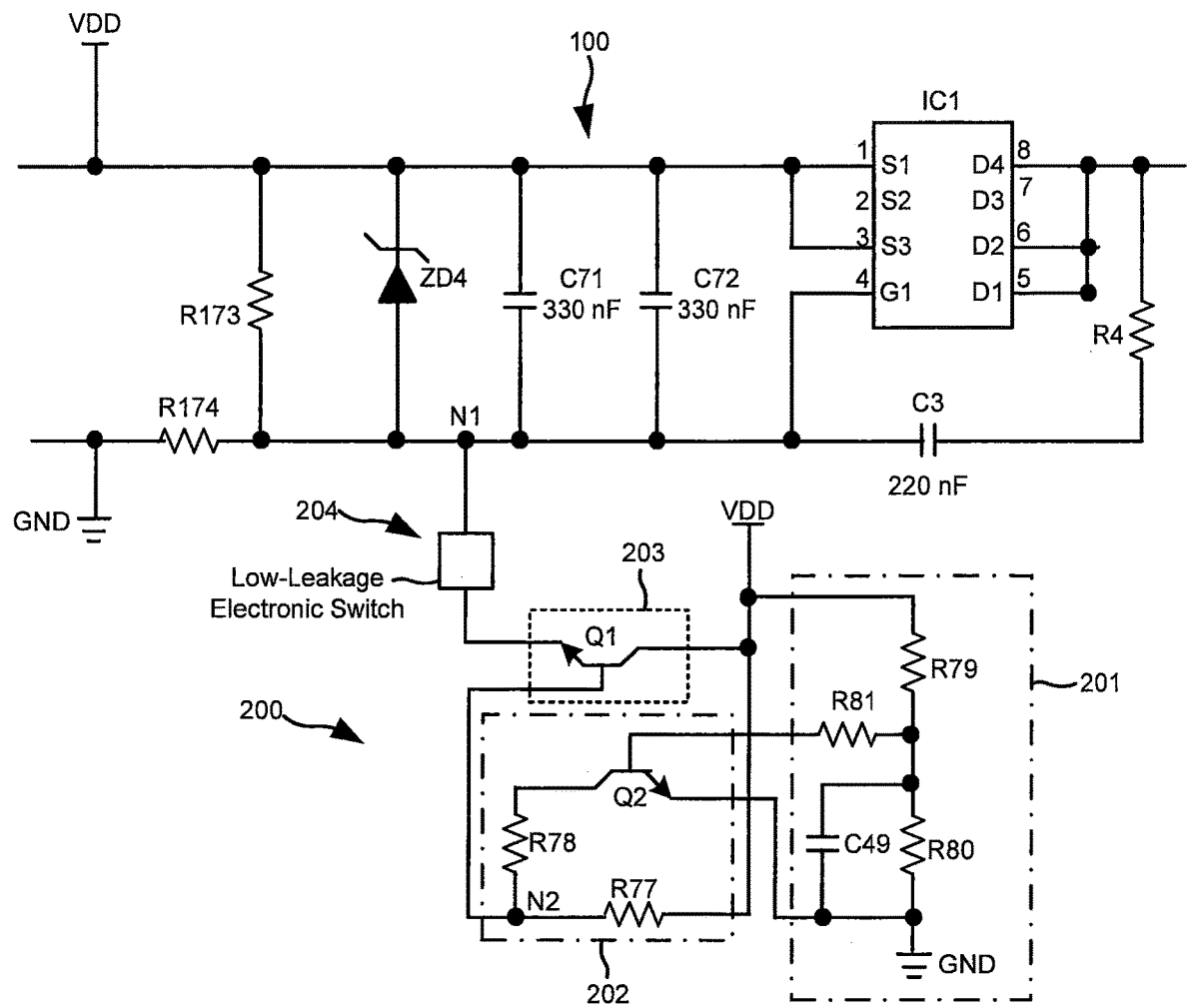

Referring now to FIG. 7, the rapid discharge method of one embodiment of the present invention will be described.

In Step 701, a rapid discharge circuit of one embodiment of the present invention is provided. The discharge circuit comprises a detection circuit, a control circuit, an executing circuit and a blocking circuit.

In Step 702, the rapid discharge circuit is coupled to the circuit prior to discharge and is also coupled to the power supply.

In Step 703, the detection circuit is used to detect the voltage of the power supply.

In Step 704, responsive to the detected voltage decreasing to a value lower than the specified threshold value, the control circuit is used to form a start signal.

In Step 705, responsive to the start signal, the executing circuit is used to form a current path to discharge the circuit, wherein, when the power supply is turned on, the blocking circuit coupled to the executing circuit is switched off so as to prevent the formation of a leakage current in the executing circuit; and, responsive to the start signal, the blocking circuit and the executing circuit are switched on, so as to form a discharge loop from one end of the circuit pending discharge through the executing circuit and the blocking circuit to the other end of the circuit pending discharge.

The above describes embodiments of the present disclosure with reference to the drawings. However, it should be understood that these embodiments are only illustrative and not a limitation on the claims of the present application. In the calculation process in the description of the embodiments, all values used are merely illustrative and are not intended to limit the embodiments of the present disclosure; the embodiments of the present disclosure may use different values for calculation. The embodiments of the present disclosure may be combined freely without departing from the scope of the present disclosure. In addition, persons skilled in the art may, according to the instructions of the present disclosure, carry out various modifications on the embodiments and details etc. of the present disclosure without departing from the scope of the present disclosure.

Accordingly, all such modifications are included within the spirit and scope of the present disclosure as defined in the following Claims.

That which is claimed is:

1. A circuit comprising:
   a soft-start circuit that includes a soft-start field-effect transistor and a first external capacitance bridging the gate and source of the soft-start field-effect transistor
   a rapid discharge circuit coupled to the soft-start circuit, the rapid discharge circuit comprising a blocking circuit that is configured to be turned off when the soft-start circuit is turned on and is configured to be switched on when the soft-start circuit is turned off.

2. The circuit of claim 1, wherein the rapid discharge circuit further comprises a detection circuit that is coupled to a power supply and that is configured to detect a voltage of a signal output by the power supply.

3. The circuit of claim 2, wherein the rapid discharge circuit further comprises a control circuit that is configured to generate a start signal in response to the detected voltage of the signal output by the power supply decreasing below a specified threshold value.

4. The circuit of claim 3, wherein the rapid discharge circuit further comprises an executing circuit having a first node that is coupled to the power supply and a second node that receives the start signal.

5. The circuit of claim 4, wherein the blocking circuit includes a first terminal that is coupled to a third node of the executing circuit and a second terminal that is coupled to the soft start circuit.

6. The circuit of claim 5, wherein the executing circuit and the blocking circuit are configured to switch on in response to the start signal to form a current path for discharging the soft start circuit.

7. The circuit of claim 6, wherein the detection circuit comprises a voltage divider, wherein a first end of the voltage divider is coupled to the power supply, a second end of the voltage divider is coupled to a reference voltage, and a voltage-dividing end of the voltage divider is coupled to the control circuit.

8. The circuit of claim 7, wherein the control circuit includes a first transistor and the voltage-dividing end of the voltage divider is coupled to the control electrode of the first transistor.

9. The circuit of claim 4, wherein the executing circuit comprises a second transistor and the second node that receives the start signal is a control electrode of the second transistor.

10. The circuit of claim 1, wherein the blocking circuit comprises a diode.

11. A circuit comprising:
   a soft-start circuit that includes a soft-start field-effect transistor and a first external capacitance bridging a gate and a source of the soft-start field-effect transistor; and
   a rapid discharge circuit coupled to the soft-start circuit, the rapid discharge circuit comprising:
      a blocking circuit that is configured to be turned off when the soft-start circuit is turned on and is configured to be switched on when the soft-start circuit is turned off; and
      a detection circuit that is coupled to a power supply and that is configured to detect a voltage of a signal output by the power supply;
      a control circuit that is configured to generate a start signal in response to the detected voltage of the signal output by the power supply decreasing below a specified threshold value; and
      an executing circuit in the form of a first transistor having a second node that receives the start signal.

12. The circuit of claim 11, wherein the first transistor includes a first node that is coupled to the power supply.

13. The circuit of claim 12, wherein the blocking circuit has a first terminal coupled to a third node of the executing circuit and a second terminal coupled to the soft start circuit.

14. The circuit of claim 13, wherein the executing circuit and the blocking circuit are configured to switch on in response to the start signal to form a current path for discharging the soft start circuit.

15. The circuit of claim 12, wherein the blocking circuit includes a first terminal that is coupled to a third node of the executing circuit and a second terminal that is coupled to the soft start circuit.

16. The circuit of claim 12, wherein the detection circuit comprises a voltage divider, wherein a first end of the voltage divider is coupled to the power supply, a second end of the voltage divider is coupled to a reference voltage, and a voltage-dividing end of the voltage divider is coupled to the control circuit.

17. The circuit of claim 11, wherein the control circuit comprises a second transistor that has a first electrode coupled to the second node and a control electrode that is coupled to the detection circuit.

18. The circuit of claim 11, wherein the blocking circuit comprises a diode.

19. The circuit of claim 11, wherein the blocking circuit is coupled to a gate of the soft-start field-effect transistor.

* * * * *